United States Patent [19]

Chou et al.

[11] Patent Number: 5,064,716
[45] Date of Patent: Nov. 12, 1991

[54] BLENDS OF ETHYLENE VINYL ALCOHOL COPOLYMER AND AMORPHOUS POLYAMIDE, AND MULTILAYER CONTAINERS MADE THEREFROM

[75] Inventors: Richard Tien-Hua Chou; Gedeon I. Deak, both of Wilmington, Del.

[73] Assignee: E. I. du Pont de Nemours and Company, Wilmington, Del.

[21] Appl. No.: 578,410

[22] Filed: Sep. 7, 1990

Related U.S. Application Data

[60] Division of Ser. No. 301,473, Jan. 26, 1989, Pat. No. 4,990,562, which is a continuation-in-part of Ser. No. 88,261, Aug. 24, 1987, abandoned.

[51] Int. Cl.$^5$ ............................................. B32B 5/16
[52] U.S. Cl. .................................. 428/336; 428/433
[58] Field of Search .............................. 428/433, 336

[56] References Cited

U.S. PATENT DOCUMENTS

| | | | |
|---|---|---|---|
| 3,726,945 | 4/1973 | Bottenbruch et al. | 260/807 |
| 4,079,850 | 3/1978 | Suzuki et al. | 215/10 |
| 4,420,516 | 12/1983 | Ermert et al. | 428/35 |
| 4,427,825 | 1/1984 | De Grassi et al. | 428/220 |
| 4,468,427 | 8/1984 | De Grassi et al. | 525/56 |
| 4,500,679 | 2/1985 | Maruhashi et al. | 525/57 |
| 4,501,797 | 2/1985 | Super et al. | 425/349 |
| 4,501,798 | 2/1985 | Koschak | 428/349 |
| 4,551,366 | 11/1985 | Maruhashi et al. | 428/35 |
| 4,562,718 | 12/1985 | Maruhashi et al. | 428/412 |
| 4,621,014 | 11/1986 | Lu | 428/476.9 |
| 4,696,865 | 9/1987 | Richardson et al. | 428/474.4 |
| 4,717,618 | 1/1988 | Tse et al. | 525/58 |
| 5,003,002 | 3/1991 | Ofstein | 525/58 |

FOREIGN PATENT DOCUMENTS

| | | | |
|---|---|---|---|
| 0044484 | 7/1981 | European Pat. Off. | |
| 0132565 | 2/1985 | European Pat. Off. | |
| 0214724 | 3/1987 | European Pat. Off. | |
| 3624577 | 2/1987 | Fed. Rep. of Germany | 525/58 |
| 3637446 | 5/1987 | Fed. Rep. of Germany | 525/58 |
| 53-49050 | 5/1978 | Japan | |
| 54-113629 | 9/1979 | Japan | 525/58 |
| 62-13449 | 1/1987 | Japan | 525/58 |

OTHER PUBLICATIONS

Eidman, "High Barrier Amorphous Nyton Resins and Extension of the Laminar Technology".
"Novamid©X21" (Mitsubishi Chemical Industries).

*Primary Examiner*—Melvyn I. Marquis

[57] ABSTRACT

Blends of a major portion of ethylene vinyl alcohol copolymer (EVOH) and a minor portion of an amorphous polyamide and preferably also a semicrystalline nylon are disclosed. These blends may be formed into films or multilayer structures, which can be thermoformed into containers or other articles. The presence of the minor portion of amorphous polyamide permits thermoforming of the EVOH at lower temperatures without the formation of defects.

20 Claims, No Drawings

BLENDS OF ETHYLENE VINYL ALCOHOL COPOLYMER AND AMORPHOUS POLYAMIDE, AND MULTILAYER CONTAINERS MADE THEREFROM

This is a division of U.S. application Ser. No. 07/301,473, filed Jan. 26, 1989, U.S. Pat. No. 4,990,562, which in turn is a continuation-in-part of U.S. application Ser. No. 07/088,261, filed Aug. 24, 1987, now abandoned.

BACKGROUND OF THE INVENTION

This invention relates to blends of ethylene vinyl alcohol copolymer with a minor amount of amorphous polyamide component and their use as a barrier layer in thermoformed multilayer containers and other applications.

Blends of ethylene vinyl alcohol polymers with polyamides in general are known, and have been used in packaging applications as barriers to inhibit the passage of atmospheric oxygen or other gases.

Japanese patent application 53-49050 discloses a blend of EVOH with 5 to 40 weight percent polyamide. The polyamides include a copolymer of hexamethylene diamine with isophthalic and terephthalic acids, in mole ratios of 100/0 to 50/50. The blend is formed into a film, which is said to possess excellent gas barrier properties.

U.S. Pat. No. 3,726,034, Bottenbruch et al., discloses mixtures of 70–99% polyamide and up to 30% of a hydroxyl containing polyolefin. The polyamides "consist of linear unbranched polymer chains containing no additional functional groups." Exemplified are blends of nylon 6 and EVOH.

U.S. Pat. No. 4,079,850, Suzuki et al., discloses a multilayer blow molded container, which contains a layer which may be EVOH, polyamide, or various blends, providing gas barrier properties. The polyamides which are mentioned are nylon 6, nylon 66, and nylon 12.

U.S. Pat. No. 4,427,825, Degrassi et al., discloses a composition of matter useful for making films, of polyamide and 1–65% EVOH. Nylons with melting points greater than 175° C. are preferred, such as nylon 11 or nylon 12.

U.S. Pat. No. 4,500,677, Maruhashi et al., discloses a resin composition comprising a mixture of two EVOH resins and a polyamide resin. The ratio of the EVOH resins to the nylon resin can be between 95:5 and 5:95. Nylon 6, nylon 6,6 and other polyamides having "linear alkylene group[s]" are specifically mentioned.

Ethylene vinyl alcohol copolymer (EVOH) is commonly used in the form of a thin layer together with thicker layers of less expensive structural materials, for example, polypropylene or polyethylene terephthalate, in order to form a structure which is resistant to the passage of atmospheric oxygen or other gasses. In order to make containers or oriented films of such multi-layer structures a solid phase thermoforming process is often used. However, EVOH cannot be formed at the relatively lower temperatures required for the thermoforming of many common structural materials without rupturing the EVOH layer, resulting in a loss of overall barrier performance. The present invention provides a modified EVOH composition which may be used in thermoformed multilayer structures to avoid the above mentioned problems, and without substantially sacrificing the excellent gas barrier properties of EVOH. It may also be used in other applications where stretching is required during the processing of the article, such as in shrink films.

BRIEF SUMMARY OF THE INVENTION

The present invention provides a blend consisting essentially of about 50 to about 95 percent by weight of an ethylene vinyl alcohol copolymer having a copolymerized ethylene content of about 20 to about 60 mole percent and a degree of saponification of at least about 90 %, and about 5 to about 50 percent by weight of a polyamide blend consisting essentially of about 30 to about 90 percent by weight of at least one amorphous polyamide and about 10 to about 70 percent by weight of at least one semicrystalline polyamide which is miscible with the ethylene vinyl alcohol copolymer. The present invention also provides films prepared of such blends, multiple layer structures including a layer of such blend, and formed structures prepared by stretching or thermoforming such multiple layer structures. In addition, the present invention provides a formed structure prepared by thermoforming a multiple layer structure wherein at least one of the layers is a blend consisting essentially of about 50 to about 95 percent by weight of an ethylene vinyl alcohol copolymer having a copolymerized ethylene content of about 20 to about 60 mole percent and a degree of saponification of at least about 90%, and about 5 to about 50 percent by weight of an amorphous polyamide and at least one layer of a structural polymer. The invention also includes oriented multilayer shrink films which include at least one layer of such blends.

DETAILED DESCRIPTION OF THE INVENTION

Materials and structures with barrier properties are important in many applications. Of particular interest are packaging materials which are barriers to the penetration of gases, such as oxygen, carbon dioxide, and various aromas.

In many packaging applications EVOH resins are used as relatively thin components of multilayer structures or containers. Usually the major parts of the structures are made of less expensive "structural" materials, bound to the EVOH layer by adhesive layers. The fabrication process in converting multilayer structures into final products often involves a mechanical deformation operation, such as orientation, thermoforming, or stretching in general, depending on the final form of the desired structure. However, EVOH generally exhibits very poor drawability, that is, the ability to be stretched or deformed uniformly at a temperature below its melting point. Quite often the stretching or deformation operation induces cracks, discontinuity or thinning ("neckdown") in the EVOH layer. As a result stretched or deformed multilayer structures which include a layer of EVOH resin often exhibit inferior barrier properties.

For the purposes of this invention, a deformation process includes any process for forming a shaped article (e.g., a film or a container) which (a) is distinct from the initial melt processing step and (b) which is performed at a temperature which is elevated above room temperature but lower than the melting point of the polymeric structural material. Casting of a film would not be a deformation process according to this definition because it is a melt processing step; vacuum-forming a film to prepare a container would be a deformation process. Making a film by a blown tubular process may or may not be a deformation process, depending on the temperature of the tubing or bubble at the location where blowing occurs. Examples of deformation processes include thermoforming (but excluding melt phase thermoforming), vacuum-forming, solid phase pressure forming, co-injection blow molding, co-injection stretch blow molding, tube extrusion followed by stretching, scrapless forming, forging, and tubular or flat sheet oriented film processes. Examples of articles that can be prepared using deformation processes are films and containers such as bottles, jars, cans, bowls, trays, dishes, pouches, oriented films, and shrink films. Deformation of polymeric materials is not only a way to attain such final shaped articles, but may also be a means to enhance barrier properties, mechanical properties, or even optical properties.

The temperature of the deformation step is usually determined by the "forming temperature" of the structural material, that is, the temperature at which it can be deformed. The forming temperature of a polymer is not readily related to any material properties of the polymer, except that it is normally higher than the $T_g$ of the polymer. In addition, this temperature is affected by the magnitude and rate of deformation of the particular process employed. The forming temperature of a given material for a given process can be readily determined by a person skilled in the art with a minimum of experimentation. Many structural materials have a lower forming temperature than that of EVOH, and it may be desirable for many reasons to conduct a molding operation at as low a temperature as possible. Furthermore, it may be desirable to reach an extent of deformation as high as possible. Thus the temperatures used for the deformation of such multilayer structures may be so low or the extent of deformation may be so high that the drawability of the EVOH layer is exceeded. As a consequence the desired deformed articles cannot be made without tearing or rupturing of the EVOH layer. The resulting discontinuities in the EVOH layer result in inferior oxygen barrier performance of the resulting article. An object of this invention is to provide a modified EVOH composition which may be used in deformed multilayer structures to avoid the above mentioned problems, and without substantially sacrificing the excellent gas barrier properties of EVOH. This modified composition is a blend of EVOH with an amorphous polyamide and a semicrystalline polyamide.

The first component of the composition of the present invention is an ethylene vinyl alcohol copolymer. The EVOH resins useful in this invention include resins having a copolymerized ethylene content of about 20 to about 60 mole %, especially about 25 to about 50 mole %. Copolymers of lower than about 15 to 20 mole % ethylene tend to be difficult to extrude while those above about 60 or 65 mole % ethylene have reduced oxygen barrier performance. These polymers will have a saponification degree of at least about 90%, especially at least about 95%. A degree of saponification of less than about 90% results in inferior oxygen barrier properties. The ethylene vinyl alcohol copolymer may include as an optional comonomer other olefins such as propylene, butene-1, pentene-1, or 4-methylpentene-1 in such an amount as to not change the inherent properties of the copolymer, that is, usually in an amount of up to about 5 mole % based on the total copolymer. The melting points of these ethylene vinyl alcohol polymers are generally between about 160 and 190° C.

Ethylene vinyl alcohol polymers are normally prepared by copolymerization of ethylene with vinyl acetate, followed by hydrolysis of the vinyl acetate component to give the vinyl alcohol group. This process is well known in the art.

The second component of the present invention is a polyamide component. The polyamide component comprises about 5 to about 50 percent by weight of the total composition of EVOH plus polyamide, preferably about 10 to about 35 percent, and most preferably about 15 to about 30 percent. The polyamide component is a blend of amorphous polyamide with semicrystalline polyamide. In particular, blends of at least one amorphous polyamide with 10 to 70 percent by weight of at least one semicrystalline polyamide are suitable, and blends in which the amorphous polyamide comprise about 60 to about 80 percent by weight of the polyamide component are preferred.

The term "amorphous polyamide" is well known to those skilled in the art. "Amorphous polyamide," as used herein, refers to those polyamides which are lacking in crystallinity as shown by the lack of an endotherm crystalline melting peak in a Differential Scanning Calorimeter ("DSC") measurement (ASTM D-3417), 10° C./minute.

Examples of the amorphous polyamides that can be used include those amorphous polymers prepared from the following diamines: hexamethylenediamine, 2-methylpentamethylenediamine, 2,2,4-trimethylhexamethylenediamine, 2,4,4-trimethylhexamethylenediamine, bis(4-aminocyclohexyl)methane, 2,2-bis(4-aminocyclohexyl)isopropylidine, 1,4-diaminocyclohexane, 1,3-diaminocyclohexane, meta-xylylenediamine, 1,5-diaminopentane, 1,4-diaminobutane, 1,3-diaminopropane, 2-ethyldiaminobutane, 1,4-diaminomethylcyclohexane, p-xylylenediamine, m-phenylenediamine, p-phenylenediamine, and alkyl substituted m-phenylenediamine and p-phenylenediamine.

Examples of polyamides that can be used include those amorphous polymers prepared from the following dicarboxylic acids: isophthalic acid, terephthalic acid, alkyl substituted iso- and terephthalic acid, adipic acid, sebacic acid, butane dicarboxylic acid, and the like.

Polyamides prepared from aliphatic diamines with aliphatic diacids are the traditional semicrystalline nylons (also referred to as crystalline nylons) and are not amorphous polyamides. Polyamides prepared from aromatic diamines and aromatic diacids are also known. However, certain of these all-aromatic polyamides are known to be intractable under ordinary melt processing conditions, and thus are not normally suitable. Thus the preferred amorphous polyamides are those in which either the diamine or the diacid moiety is aromatic, and the other moiety is aliphatic. The aliphatic groups of these polyamides preferably contain 4-8 carbon atoms in a chain or an aliphatic cyclic ring system having up to 15 carbon atoms. The aromatic groups of the polyamides preferably have mono or bicyclic aromatic rings which may contain aliphatic substituents of up to about 6 carbon atoms.

However, not all of these aromatic/aliphatic combinations will necessarily provide suitable amorphous polyamides. For example, specifically metaxylylenediamine adipamide is not generally suitable for this invention. This polymer readily crystallizes under heating conditions typical for thermoforming operations, and also crystallizes upon orienting. This illustrates the fact that it is important to determine that a particular polyamide is amorphous, and not to rely solely on the chemical structure of the polymer. This determination can easily be made by DSC.

Specific examples of amorphous polyamides which are suitable for this invention include: hexamethylenediamine isophthalamide, hexamethylenediamine isophthalamide/terephthalamide terpolymer, having iso-/terephthalic moiety ratios of 100/0 to 60/40, mixtures of of 2,2,4- and 2,4,4-trimethylhexamethylenediamine terephthalamide, copolymers of hexamethylene diamine and 2-methylpentamethylenediame with iso- or terephthalic acids, or mixtures of these acids. Polyamides based on hexamethylenediamine iso/terephthalamide containing high levels of terephthalic acid moiety may also be useful provided a second diamine such as 2-methyldiaminopentane is incorporated to produce a processible amorphous polymer.

The above amorphous polyamides may contain as comonomers minor amounts of lactam species such as caprolactam or lauryl lactam, even though polymers based on these monomers alone are not amorphous. The important feature is that the polyamide as a whole must be amorphous. Thus small amounts of these comonomers may be incorporated as long as they do not impart crystallinity to the polyamide. In addition, up to about 10 weight % of a liquid or solid plasticizer such as glycerol, sorbitol, or toluenesulfonamide ("Santicizer 8" from Monsanto) may be included with the amorphous polyamide.

For most applications the $T_g$ of the amorphous polyamide (as measured in the dry state, i.e., containing about 0.12 weight % moisture or less) should be in the range of about 80° C. to about 160° C., and preferably about 80° C. to about 130.C. Certain unblended amorphous polyamides, as described above, have $T_g$s of around 125° C. when dry. The lower limit on $T_g$ is not clearly demarked; 80° C. is an approximate lower limit. The upper limit on the $T_g$ is likewise not clearly demarked. But amorphous polyamides with $T_g$ above about 160° C. are not readily thermoformable when used as a barrier layer. Thus all-aromatic polyamides, having aromatic groups in both acid and amine moieties, tend to have a $T_g$ which is too high to permit thermoforming, and are thus normally unsuitable for the purposes of this invention.

The polyamide component also includes at least one semicrystalline polyamide. This term refers to the traditional semicrystalline nylons, which are generally prepared from lactams or amino acids, such as nylon 6 or nylon 11, or from condensation of diamines such as hexamethylene diamine with dibasic acids, such as succinic, adipic, or sebacic acids. Copolymers and terpolymers of these polyamides are also included, such as copolymers of hexamethylenediamine/adipic acid with caprolactam (nylon 6,66). Blends of two or more crystalline polyamides can also be used. The polyamides of the present invention, both semicrystalline and amorphous, are prepared by condensation polymerization, which is well known to those skilled in the art.

However, not all semicrystalline nylons are necessarily suitable for the present invention. The suitable nylons are those which are miscible with the EVOH component, as evidenced by the presence of a single glass transition temperature or a depressed melting point as measured by DSC. Examples of suitable semicrystalline nylons include nylon 6, nylon 66, nylon 6,66, and copolymers of nylon 6 and 12.

The blends of the present invention comprise about 50 to about 95 percent by weight EVOH and about 5 to about 50 percent by weight of a polyamide blend consisting essentially of about 30 to about 90 percent by weight of at least one amorphous polyamide and about 10 to about 70 percent by weight of at least one semicrystalline polyamide as described above. When less than about 5% of the polyamide blend is used, the improvements in formability imparted by the invention are not fully realized. When more than about 50% of the polyamide blend is used the oxygen barrier properties of the blend are degraded. When the polyamide blend is more than about 70% semicrystalline polyamide the oxygen barrier properties and processability are reduced. Preferably such blends will contain about 75 to about 85 weight % EVOH and about 25 to about 15% weight percent polyamide blend component. Of course, small amounts of other material such as other polymers, processing aids, antioxidants, fillers, pigments, etc. may be included in the blend without destroying the essence of this invention.

The blends of the present invention may be prepared by blending techniques well known in the art, including the use of single or twin screw melt processors or extruders. Blending is performed at temperatures sufficiently high to form a uniform melt of the components to be blended, typically about 200° to about 225° C., above the melting points of the two components. The blends of the present invention may be prepared by blending EVOH and a preblended mixture of amorphous polyamide and semicrystalline polyamide. Alternatively, they may be prepared by blending the three components simultaneously. The former procedure is preferred when the semicrystalline polyamide has a high melting point, i.e., higher than about 225° C.

The blends of the present invention may be formed into a film, which may be done by typical equipment such as extrusion casting or blown film if desired, by known techniques.

In addition, multiple layer structures which . contain one or more layers of the blend of the present invention may be prepared. These structures may be incorporated into containers, which take advantage of the oxygen barrier properties of the blend of the present invention. In making multilayer containers, a structural layer will often be used, to provide structural support for the blend layer. The materials used for the structural layers may be made, for example, from any of a variety of structural polymers. Examples of such structural polymers include polyolefins such as polybutylene, polypropylene (either homopolymers or copolymers with ethylene), polyethylene homopolymer or co- or terpolymers of ethylene with other monomers such as vinyl acetate, carboxylic acids, such as acrylic acid, or methacrylic acid (with or without neutralization to form ionomers), polyethylene terephthalate or its copolymers, and polymers based on vinyl chloride or styrene, and the like.

The various layers of such multiple layer structures may be held together by any of a variety of adhesive resins. In general, such adhesive resins are thermoplastic polymers having carbonyl groups derived from functional groups of free carboxylic acids, carboxylic acid salts, carboxylic acid esters, carboxylic acid amides, carboxyic anhydrides, carbonic acid esters, urethanes, ureas or the like. In these thermoplastic polymers, the carbonyl group concentration may be changed in a broad range, but in general, it is preferred to use a thermoplastic polymer containing carbonyl groups at a concentration of 10 to 1400 millimoles per 100 g of the polymer. Suitable adhesive resins include polyolefins modified with at least one ethylenically unsaturated monomer selected from unsaturated carboxylic acids and anhydrides, esters and amides thereof, especially polypropylene, high density polyethylene, low density polyethylene and ethylene-vinyl acetate copolymers modified with at least one member selected from acrylic acid, methacrylic acid, crotonic acid, fumaric acid, itaconic acid, maleic anhydride, itaconic anhydride, citraconic anhydride, ethyl acrylate, methyl methacrylate, ethyl maleate, 2-ethylhexyl acrylate, acrylamide, methacrylamide, fatty acid amides, and imides of the acids described above. The adhesive can also be prepared from an ethylene polymer and a second polymer grafted with maleic anhydride, as disclosed in U.S. Pat. No. 4,230,830, the disclosure of which is incorporated herein by reference. In addition, as the adhesive resin, there can be used ethylene-acrylate copolymers, ionomers, polyalkylene oxide-polyester block copolymers, carboxymethyl cellulose derivatives, and blends of these polymers with polyolefins.

It has been discovered that the blends of this invention can be used to make films and multiple layer structures which not only have excellent oxygen barrier properties, but also exhibit superior deformation characteristics. These structures can be deformed, stretched into biaxially oriented film, or thermoformed into shaped containers without occurrence of breaks or discontinuities in the EVOH blend layer, in contrast to the behavior of multilayer structures involving either EVOH by itself, or EVOH blended with crystalline polyamides. These structures, furthermore, can achieve a high degree of deformation, orientation, thermoforming, or stretching in any form, in a broad temperature range, in contrast to the behavior of either EVOH alone, EVOH blended with crystalline polyamide, or even EVOH blended with amorphous polyamide.

For certain applications, however, blends comprising about 50 to about 95 (preferably about 70 to about 90) weight % EVOH, described above, and about 50 to about 5 (preferably about 30 to about 10) weight % of amorphous polyamide may be satisfactorily used, without additional semicrystalline polyamide. Such blends are useful in preparation of thermoformed or stretch blow molded articles from a multilayer laminate in which at least one layer is such a blend. When less than about 5 weight % of the amorphous polyamide is used, the thermoformability of the blend is not significantly improved. When more than about 50% of the amorphous polyamide is used the oxygen barrier properties of the blend are degraded. Most preferably such blends will contain about 75 to about 85 weight % EVOH and about 25 to about 15% weight percent amorphous polyamide component. Of course, small amounts of other material such as other polymers, processing aids, antioxidants, fillers, pigments, etc. may be included in the blend without destroying the essence of this invention.

The thermoforming or stretch blow molding operations for which such two component blends are useful are those deforming operations, generally described above, which further require that the blend be deformed in three dimensions more or less simultaneously. The use of the amorphous polyamide, even without the semicrystalline nylon, provides significant improvements in such thermoformability in comparison with the results obtained when EVOH is used alone or as a blend with a semicrystalline nylon. For such thermoforming operations a comparatively thick multilayer laminated sheet or preform is normally used, having a total thickness preferably from about 0.5 to about 3.5 mm, preferably 0.5 to about 3.0 mm, and most preferably about 1.0 to about 2.5 mm. This sheet will preferably comprise at least one layer of the two component blend, typically about 10% of the total thickness, e.g. 0.05 to 0.35 mm thick, and at least one, and preferably two, structural layers as described above, about 0.25 to about 1.2 mm, and preferably about 0.5 to about 1.0 mm, thick. Optional adhesive layers, as described above, may also be provided. By the thermoforming process the sheet is converted into a three dimensional product of reduced thickness, typically about 0.15 mm to about 1.0 mm thick, preferably about 0.25 to about 0.75 mm thick.

While not wishing to be bound by any particular theory, it is believed that the improvements of the present invention can be understood by considering the microscopic structure of blend of EVOH with polyamides. Electron microscopy shows that blends of amorphous polyamides with EVOH form two-phase systems. Electron microscopic examination of the core layer of a structure prepared from a blend of EVOH with an amorphous polyamide, Example 4 below, shows a distinctly two-phase structure, with particle size of the amorphous polyamide inclusions in the 0.4 to 2 micrometer range. After the thermoforming step, electron microscopy shows that the inclusions are deformed into thin lamellae, which are believed to reinforce the EVOH matrix. In contrast, electron microscopy of the core layer of a structure incorporating a blend of EVOH with nylon 612, semicrystalline, Comparative Example C6, below, before thermoforming shows a similar two-phase structure. But after thermoforming, the polyamide inclusions do not show significant deformation. Thus it appears that the amorphous polyamides included in the matrix can flow at temperatures lower than those which would be required for deformation of crystalline polyamides. Yet another behavior is observed upon microscopic examination of the core layer of comparative example C4, below. This blend of EVOH with nylon 6 was compatible and formed essentially a single phase structure with no significant visible domains of polyamide either before or after thermoforming. When semicrystalline nylon is added to blends of EVOH and amorphous polyamide, however, it is believed that the semicrystalline nylon serves as a partially compatibilizing component.

EXAMPLES

Example 1 and Comparative Examples C1-C3

Preparation of Blends

An EVOH polymer, containing 30 mole % ethylene and having a melt flow index of 3, as measured at 210° C. with 2160 g weight (ASTM D-1238), was melt blended with one of a variety of polyamides, as indicated in Table I. For Example 1, an amorphous polyamide was used, the condensation polymer of hexamethylenediamine (96.5 mole %), 4,4-bis(aminocyclohexyl)methane (3.5 mole %) and a 70/30 mixture of isophthalic and terephthalic acids. This polyamide is designated in Table I as "APA1." This polyamide was shown to be amorphous by the lack of any melting endotherm peak on DSC heating curves (ASTM D-3417). As a comparative example, (C1) EVOH was blended with nylon 6,12, or was evaluated without blending (C2 and C3). The weight ratios of the EVOH and the polyamides in each blend are indicated in Table I. Blending was accomplished on a twin-screw melt processor (extruder), 30 mm diameter, working at 50 rpm. The melt temperature was between 210° and 220° C. The polymer blend was extruded into a strand, cooled by air, and cut into pellets approximately 2 to 3 mm in diameter.

Physical Properties of Films

Films, 0.01 to 0.02 mm thick, were cast from the above blends, and for comparison, from unblended EVOH resins, as indicated in Table I. The oxygen permeabilities of these film samples were measured according to ASTM D-3985. The results show that the oxygen barrier properties of the blend of EVOH with the amorphous polyamide are comparable to those of unblended EVOH.

Preparation of Multilayer Structures

Next, samples of the blends used in the above examples, as well as the unblended EVOH resins, were coextruded into 1.5 mm multilayer sheet samples. Three single screw extruders, a combining adapter, and a 35 cm wide single manifold sheeting die were used. The two surface layers, polypropylene homopolymers with a melt flow index of 4 (ASTM D-1238 Condition L) and each 0.6 to 0.7 mm thick, were extruded on a 38 mm single screw extruder, L/D=24, turning at 75 rpm, at a melt temperature of 233 C. Two adhesive layers, 0.02 to 0.04 mm thick, a blend of maleic anhydride grafted ethylene propylene copolymer in an ethylene vinyl acetate copolymer matrix, were extruded on a 32 mm single screw extruder, L/D=24, turning at 6 rpm, at a melt temperature of 220° C. The sample core layers (blends or EVOH) 0.1 mm thick, were extruded on a 25 mm single screw extruder, L/D=24, equipped with a grooved feed section, turning at 10 rpm, with a melt temperature of 215° C. The casting rolls were cooled with water having a temperature of 95° C. The casting speed was 0.6 m/min.

Thermoforming of Multilayer Structures

Subsequently, the cast multilayer sheets were thermoformed by solid state pressure forming on an Illig TM RDM-37/10 continuous roll fed thermoformer into cylindrical, can shaped containers, 67 mm diameter and 102 mm deep. The sheet samples were heated by ceramic heaters operating at 320° C. to 380° C. The sheet samples attained the temperatures indicated in Table II. Forming was accomplished by using plug assist, air pressure of 480 kPa, and molding rates of 10 to 12 cycles/min.

The formed containers made with the EVOH as the barrier layer exhibited grooves on their side walls running parallel to the axis of the containers. Microscopic examination of the cross section of the container sidewalls cut perpendicular to the axis revealed numerous discontinuities of the EVOH core. It is believed that these discontinuities are the result of exceeding the formability limits of these EVOH resins during the thermoforming operation. Containers made with blends of EVOH with the aliphatic, crystalline nylons also had similar grooves. In contrast, the containers made using the blend of EVOH with the amorphous polyamide did not exhibit grooves.

To quantify these findings, counts were made of the core interruptions (grooves or breaks) and core neckdowns (thinning of the core layer without actual discontinuity) per 25 mm wall section. The results are given in Table II. The thermoformed structure prepared using the blend of the present invention was greatly superior to the comparative examples in terms of number of breaks or neckdowns. Such discontinuities in the barrier layer of the container will necessarily result in loss of barrier performance.

TABLE I

| EXAMPLE | POLYAMIDE | (%) | THICKNESS (mm) | OPV[1] |
|---|---|---|---|---|
| 1 | APA1 | 10 | 0.011 | 0.0023 |
| C1 | nylon 612 | 10 | 0.018 | 0.0054 |
| C2 | none | 0 | 0.018 | 0.0031 |
| C3 | none | 0 | 0.021 | 0.0023 |

[1] cc-mm/m²-day-atm at 30° C., 0% relative humidity

TABLE II

| | THERMOFORMED COEXTRUDED SHEET | | | |
|---|---|---|---|---|
| EXAMPLE | TEMP (°C.) | DRAW[1] | BREAKS/ 25 mm | NECKDOWNS/ 25 mm |
| 1 | 163 | 6.9 | 0 | 6 |
| C1 | 163 | 6.7 | 6 | 34 |
| C2 | 162 | 6.5 | 8 | 34 |
| C3 | 164 | 6.9 | 25 | 11 |

[1] Ratio of initial to final film thickness

Examples 2–6 and Comparative Examples C4–C9

Preparation of Blends

For these blends, the same ethylene vinyl alcohol copolymer was used as in Example 1. This EVOH was blended with a condensation polymer of hexamethylenediamine with a 70/30 mixture of isophthalic and terephthalic acids, which is designated in Table III as "APA2." This polyamide was shown to be amorphous by the lack of any melting endotherm peak on DSC heating curves (ASTM D-3417). For comparative examples C4–C6, the EVOH was blended with nylon 6, nylon 666, or nylon 612, as indicated in Table III. For Comparative Examples C7–C9, EVOH was evaluated alone. For Comparative Example C10, the amorphous polyamide APA2 was evaluated alone. The weight ratios of the EVOH and the polyamide in each blend is indicated in Table III. Blending and extrusion were accomplished in the same manner as in Example 1, except that the blending speed was 150 rpm.

Physical Properties of Films

Films, 0.01 to 0.05 mm thick, were cast from the above blends and, for comparison, from unblended EVOH resins, as indicated in Table III. The films were cast on a coextrusion casting line, with polypropylene layers approximately 0.25 mm thickness on each side of the sample film extruded simultaneously. These polypropylene layers were separated and discarded before testing of the film samples. The purpose of this procedure was to simulate a thin core barrier layer produced during coextrusion. The oxygen permeabilities of these film samples were measured as for Example 1, and are presented in Table III. It may be seen that the oxygen permeabilities of films prepared from blends of amorphous polyamides and EVOH are significantly better than those of the corresponding blends of EVOH and nylon 6 or nylon 666 copolymer.

The pin hole flex lives (ASTM F-456) of the films of these examples and comparative examples were measured, and are reported in Table III. Pin hole flex life is an important measure of film toughness, since the formation of pin holes in a barrier film due to flexing results in degradation of barrier properties. Surprisingly, the pin hole flex lives of the films prepared from EVOH and APA2 blends are better than those of the comparative examples prepared from the unmixed blend components (C7-C10).

Preparation and Thermoforming of Multilayer Structures

Multilayer sheet samples were prepared using the materials of Examples 2-6 and Comparative Examples C4-C7 and C9, using the same procedure as was used with Example 1, except that the cooling water used was 70° C. Subsequently these multilayer samples were thermoformed using the same conditions as for Example 1, and were analyzed for discontinuities in the walls in the same manner as in the earlier examples. The results are shown in Table IV. It is clear that the containers made from the blends of the present invention are superior to those made using either EVOH alone as a core material, or to those made using blends of EVOH with crystalline nylon as the core material.

TABLE III[1]

| EXAMPLE | POLYAMIDE | (%) | THICKNESS (mm) | OPV[2] | PINHOLE FLEX[3] |
|---|---|---|---|---|---|
| 2 | APA2 | 10 | 0.048 | 0.0039 | 1500 |
| 3 | APA2 | 20 | 0.040 | 0.0031 | 1410 |
| 4 | APA2 | 20 | 0.015 | 0.0047 | 1759 |
| 5 | APA2 | 30 | 0.017 | 0.0050 | 1585 |
| 6 | APA2[4] | 20 | 0.012 | 0.0023 | 1750 |
| C4 | nylon 6 | 20 | 0.014 | 0.0194 | 2855 |
| C5 | nylon 666 | 20 | 0.026 | 0.0174 | 2698 |
| C6 | nylon 612 | 20 | 0.018 | 0.0012 | 1998 |
| C7 | none | 0 | 0.045 | 0.0047 | 892 |
| C8 | none | 0 | 0.023 | 0.0031 | 1270 |
| C9 | none | 0 | 0.020 | 0.0019 | 1150 |
| C10 | APA2 | 100 | 0.018 | — | 1092 |

[1]A dash (—) indicates that the measurement was not made.
[2]OPV defined as in Table I.
[3]cycles to failure
[4]containing 10% glycerol

TABLE IV

| | THERMOFORMED COEXTRUDED SHEET | | | |
|---|---|---|---|---|
| EXAMPLE | TEMP (°C.) | DRAW | BREAKS/ 25 mm | NECKDOWNS/ 25 mm |
| 2 | 159 | 7.0 | 1 | 18 |
| 3 | 159 | 7.1 | 1 | 7 |
| 4 | 161 | 7.1 | 0 | 0 |
| 5 | 159 | 6.4 | 0 | 0 |
| 6 | 159 | 6.8 | 0 | 1 |
| C4 | 159 | 7.4 | 9 | 37 |
| C5 | 157 | 6.3 | 9 | 45 |
| C6 | 159 | 7.2 | 17 | 38 |
| C7 | 156 | 8.2 | 12 | 31 |
| C9 | 160 | 6.2 | 34 | 7 |

Examples 7-8 and Comparative Examples C11-C13

Preparation of Blends

The EVOH polymer of Example 1 was melt blended with a variety of polyamides, as indicated in Table V. For these examples mixtures of the amorphous polyamide APA2, defined above, and a crystalline polyamide, nylon 6 (polycaprolactam) were blended with the EVOH. The polyamide mixtures were prepared by melt blending the two polyamides in a batch extruder at 250° C., before further blending with EVOH at 225° C. in a 30 mm twin screw extruder. In comparative Examples C11-C13, EVPH was blended with nylon 6 alone (C13), or was used without addition of any polyamide (C11, C12). The EVOH used in C11 and C13 was the same as that of Example 1; that of C12 contained 44 mol % ethylene and had a melt index of 16. After blending on the twin screw extruded, the blend was extruded and pelletized as in Example 1.

Physical Properties of Films

Table V lists the barrier properties of monolayer films prepared from the above blends or unblended EVOH resins, prepared and measured as in Example 1. The oxygen barrier properties of the blend of EVOH with the mixture of amorphous and crystalline polyamide are comparable to those of unblended EVOH.

Preparation and Orientation of Multilayer Structures

The blends and unblended EVOH resins were coextruded into multilayer structures substantially as in Example 1. The adhesive layers, each about 0.01 to 0.03 mm thick, were a maleic anhydride grafted copolymer of propylene and ethylene with a melt index of 7. The temperature of the extruder for the adhesive layers was maintained at 230° C., the extruder for the core layer at 225° C., the cooling water at 70° C., and the casting speed was about 4 m/min The thicknesses of the multilayer films are reported in Table VI.

Thereafter the multilayer structures were biaxially oriented with a film stretcher (manufactured by T. M. Long Co.) under the conditions indicated in Table VI. The drawing was simultaneously in the machine and transverse directions, at 4000% per minute. The oxygen transmission rate and film quality of the oriented films are listed in Table VI. Haze was measured according to ASTM D-1003.

The results in Table VI show that the multilayer structures of Examples 7 and 8 had excellent drawability, and the resulting oriented films exhibited excellent oxygen barrier and optical properties. In contrast, the structures of Comparative Examples C11 and C12 cannot withstand the drawing operation. Under optical microscopy, discontinuity (breakdown) in the core layer is observed. The addition of 20% nylon 6 in C13 improved the drawability somewhat, but the results were still unsatisfactory. Optical microscopy showed that the core layer was drawn unevenly (neckdown). Both breakdown and neckdown had a noticeable effect on the appearance of the oriented film.

TABLE V

| EX | % EVOH | POLYAMIDES AMORPH., % | CRYSTAL., % | FILM THICK (mm) | OPV | (% RH) |
|---|---|---|---|---|---|---|
| 7 | 80 | 16 | 4 | 0.066 | 0.067 | (79) |
| 8 | 80 | 12 | 8 | 0.047 | 0.082 | (79) |
| C11 | 100 | 0 | 0 | 0.025 | 0.070 | (80) |
| C12 | 100 | 0 | 0 | 0.025 | 0.296 | (80) |
| C13 | 80 | 0 | 20 | 0.035 | 0.141 | (76) |

TABLE VI

| EX | THICK.[1] | STRETCH CONDIT'N RATIO, °C. | ORIENTED THICK, mm | OTR[2] | (% RH) | HAZE (%) | QUAL[3] |
|---|---|---|---|---|---|---|---|
| 7 | .071/.73 | 4 × 4 145 | 0.019 | 20.8 | (89) | 2.0 | A |
|   |          | 6 × 6 150 | 0.016 | 30.5 | (90) | — | B |
| 8 | .069/.72 | 4 × 4 145 | 0.019 | 23.4 | (89) | 2.0 | A |
|   |          | 6 × 6 155 | 0.014 | 17.1 | (80) | 1.7 | A |
| C11 | .061/.72 | 4 × 4 145 | 0.025 | 1300 | (80) | — | D |
|   |          | 6 × 6 155 | 0.015 | 2300 | (80) | — | D |
| C12 | .053/.72 | 4 × 4 145 | 0.023 | 2200 | (80) | — | D |
|   |          | 6 × 6 155 | — | — | — | — | D |
| C13 | .071/.72 | 4 × 4 145 | 0.042 | 89.3 | (80) | 2.6 | C |
|   |          | 6 × 6 155 | 0.014 | 215 | (80) | 1.5 | C |

[1]Thickness of core layer/thickness of total multilayer structure before stretch, in mm.
[2]Oxygen Transmission Rate in cc/m²-24 hr-atm at 30° C. and the relative humidity indicated.
[3]Quality of film: A - excellent; B - slight haze; C - neckdown; D - breakdown.

Examples 9–10 and Comparative Examples C14–C17
Preparation of Blends the same EVOH was used as in Example 1, except for Comparative Example C14, which used the EVOH of C12. EVOH and polyamides were blended together as in Example 7. The amorphous polyamide was APA2; the semicrystalline nylons of each blend were as indicated in Table VII. The barrier properties of these monolayer films are presented in Table VII.

Preparation and Orientation of Multilayer Structures

Five-layer coextruded sheets were prepared as in Example 7, except that the adhesive resin had a melt index of 2, and the surface structural layers were propylene/ethylene copolymers with a melt flow index of 2 and a density of 0.90. These multilayer structures were biaxially oriented as in Example 7. The barrier properties and film quality of the oriented films are reported in Table VIII.

The results show that the multilayer structures of Examples 9 and 10 only could be satisfactorily oriented. Those oriented films had excellent optical and barrier properties and were heat shrinkable, as indicated in Table IX. Modulus, tensile strength, and elongation were measured according to ASTM D882. Film shrinkage was obtained by immersing the oriented film in oil at 120° C to measure the percent shrinkage of film length. Shrink force was measured according to ASTM 2838. None of the comparative examples was satisfactory. C14 was difficult to draw and the resulting oriented film was very hazy. Both C15 and C17 could not withstand the drawing conditions. The oriented film of C16 exhibited neckdown.

TABLE VII

| EX | % EVOH | POLYAMIDES AMORPH., % | POLYAMIDES CRYSTAL[1], % | FILM THICK (mm) | OPV | (% RH) |
|---|---|---|---|---|---|---|
| 9 | 80 | 12 | A, 8 | 0.047 | 0.082 | (79) |
| 10 | 80 | 12 | B, 8 | 0.048 | 0.107 | (79) |
| C14 | 80 | 20 | 0 | 0.051 | 0.110 | (80) |
| C15 | 80 | 20 | 0 | 0.051 | 0.268 | (76) |
| C16 | 80 | 0 | B, 20 | 0.038 | 0.143 | (76) |
| C17 | 92 | 0 | A, 8 | — | — | |

[1]Semicrystalline polyamide A is nylon 6; B is a copolymer of 85 parts nylon 6 and 15 parts nylon 66, melting point 202° C.

TABLE VIII

| EX. | THICK.[1] | STRETCH CONDIT'N RATIO, °C. | ORIENTED THICK, mm | OTR[2] | (% RH) | HAZE (%) | QUAL[3] |
|---|---|---|---|---|---|---|---|
| 9 | .041/.56 | 6 × 6, 130 | 0.018 | 17.1 | (80) | 1.5 | A |
|   |          | 6 × 6, 140 | 0.014 | 19.5 | (80) | 1.4 | A |
| 10 | .061/.63 | 6 × 6, 130 | — | — |  |  | F |
|   |          | 6 × 6, 140 | 0.014 | 15.5 | (80) | 1.2 | A |
| C14 | .053/.64 | 6 × 6, 130 | 0.019 | 10.7 | (80) | 9.7 | H |
|   |          | 6 × 6, 140 | 0.014 | >3000 | (80) | 18.3 | D |
| C15 | .051/.59 | 6 × 6, 130 | 0.015 | 1500 | (80) | 34.7 | D |
|   |          | 6 × 6, 140 | — | — |  | 7.6 | D |
| C16 | .056/.58 | 6 × 6, 130 | — | — |  | — | F |
|   |          | 6 × 6, 140 | 0.013 | 33.5 | (79) | 1.3 | G |
| C17 | .061/.66 | 6 × 6, 130 | — | — |  | — | F |
|   |          | 6 × 6, 140 | — | — |  | 5.8 | D |

[1]Thickness of core layer/thickness of total multilayer structure before stretch, in mm.
[2]Oxygen Transmission Rate in cc/m²-24 hr-atm at 30° C. and the relative humidity indicated.
[3]Quality of film: A excellent; D breakdown; F failed to draw; G good; H hazy, difficult to draw.

TABLE IX

MULTILAYER FILMS

| Ex. | Modulus (MPa) | Tensile Str (MPa) | Elong. (%) | Shrink.[1] (%) | Shrink force (MPa, 120° C.) | OTR[2] |
|---|---|---|---|---|---|---|
| 9  | 1930 | 165 | 91  | 20 | 3.51 | 15.3 |
| 10 | 1830 | 159 | 104 | 19 | 3.10 | 16.7 |

[1]Shrinkage and shrink force measured on films obtained by stretching 5X in each direction at 135° C.
[2]Oxygen transmission rate as in Table VIII.

Example 11

A blend was prepared as in Example 8, and a five-layer structure was prepared as in Example 7, except that the adhesive was a maleic anhydride grafted linear low density polyethylene with a melt index of 3.5 (ASTM D-1238), and the structural material was a linear low density polyethylene. The total thickness of the structure was 0.67 mm; the thickness of the core layer was 0.04 mm. When this multilayer structure was stretched 4× in each direction at 110° C., a slightly hazy film (Haze =6.7%), 0.30 mm thick, was obtained. The same stretching at 120° C. resulted in a slightly hazy film (Haze =8.1%) 0.028 mm thick. When stretching 6× in each direction at 110° C. was attempted, the film failed to draw.

Examples 12–19

Preparation of Blends

The same EVOH and amorphous polyamide were used as in Example 7. Three types of semicrystalline nylon were used, as indicated in Table X. For Examples 12–18 the blending was performed as in Example 7. For Example 19, the three components of the blend were blended at 230° C. in one step on a 30 mm twin screw extruder. Table X reports the barrier properties of monolayer films prepared from these blends.

Preparation and Orientation of Multilayer Structures

Five-layer coextruded sheets were prepared using the materials of Examples 12–19 as the core layer, using the procedure of Example 7. The outer structural polymer was a propylene homopolymer, melt index 6. The adhesive polymer was that of Example 9. These multilayer sheets were biaxially oriented as in Example 7. All the oriented film exhibit excellent barrier properties and optical appearance as indicated in Table XI.

TABLE X

| EX. | % EVOH | POLYAMIDES AMORPH., % | POLYAMIDES CRYSTAL[1], % | FILM THICK (mm) | OPV (79% RH) |
|---|---|---|---|---|---|
| 12 | 90 | 8  | A,  2  | —     | —     |
| 13 | 70 | 24 | A,  6  | 0.044 | 0.102 |
| 14 | 60 | 32 | A,  8  | 0.036 | 0.133 |
| 15 | 80 | 14 | A,  6  | 0.061 | 0.130 |
| 16 | 80 | 8  | A, 12  | 0.065 | 0.126 |
| 17 | 65 | 21 | A, 14  | 0.042 | 0.122 |
| 18 | 80 | 12 | B,  8  | 0.048 | 0.087 |
| 19 | 80 | 14 | C,  6  | 0.036 | 0.082 |

[1]Semicrystalline polyamide A is nylon 6; B is a copolymer of 85 parts nylon 6 and 15 parts nylon 66, melting point 202° C.; C is a copolymer of 27 parts nylon 6 and 73 parts nylon 66, m.p. 216° C.

TABLE XI[1]

| EX. | THICKNESS | STRETCH CONDIT'N RATIO, °C. | ORIENTED THICK, mm | OTR | (% RH) | HAZE (%) |
|---|---|---|---|---|---|---|
| 12 | .119/.62 | 6 × 6, 145 | 0.015 | 11.9 | (91) | 3.6 |
| 13 | .053/.56 | 7 × 7, 145 | 0.009 | 40.1 | (91) | 2.2 |
| 14 | .053/.56 | 7 × 7, 145 | 0.009 | 71.1 | (91) | 2.1 |
| 15 | .051/.56 | 6 × 6, 145 | 0.015 | 57.4 | (92) | 2.1 |
| 16 | .051/.56 | 6 × 6, 145 | 0.013 | 58.6 | (92) | 1.5 |
| 17 | .051/.56 | 6 × 6, 145 | 0.013 | 66.7 | (92) | 1.5 |
| 18 | .053/.56 | 7 × 7, 145 | 0.010 | 66.7 | (92) | 1.4 |
| 19 | .053/.56 | 6 × 6, 145 | 0.013 | 31.9 | (92) | 2.3 |

[1]Terms as defined in Table VI.

Example 20 and Comparative Examples C18–C19

The blend of Example 20 was the same as that of Example 7. The blends of Comparative Examples C18 and C19 are the same as those of Comparative Examples C11 and C12, respectively.

Five-layer coextruded sheet samples were prepared using the materials of Example 20, C18, and C19 as the core layer, styrene homopolymer with a melt flow index of 1.3 (ASTM D-1238 condition G) as the two outer layers, and a maleic anhydride grafted copolymer of ethylene and vinyl acetate with a melt flow index of 3 as the two adhesive layers. The sheet was prepared as in Example 7. The total thickness of each sheet was about 1.3 mm and the core layer thickness was about 0.10–0.13 mm.

Subsequently the sheets were thermoformed by solid state pressure forming on a thermoformer into cylindrical, cup-shaped containers, 65 mm diameter at top and bottom and 65 mm deep. The sheet samples were heated by a ceramic heater operating at 320 to 380° C. The sheet samples attained the temperatures indicated in Table XII. Forming was accomplished using plug assist, air pressure of 480 kPa, and molding rates of 10 to 12 cycles per minute.

Microscopic examination of the cross section of the container sidewalls cut perpendicular to the axis revealed breakdown or neckdown of the EVOH cores for Comparative Examples C18 and C19. It is believed that these are the result of exceeding the formability limits of these EVOH resins during the thermoforming operation. Even the EVOH with 44 mol % ethylene cannot avoid this limitation at the temperatures indicated in Table XII. In contrast the containers made from Example 20 did not exhibit core discontinuity. To quantify these findings, counts were made of the core interruptions (discontinuities or breaks) and core neck-downs (thinning of the core layer without actual discontinuity) per 25 mm (1 inch) wall section. The results in Table XII show the superiority of the structures prepared from the blend of the present invention. Discontinuities necessarily result in loss of barrier performance.

TABLE XII

THERMOFORMED COEXTRUDED SHEET

| Ex. | Forming Temp. (°C.) | Breaks/ 25 mm | Neckdowns/ 25 mm |
|---|---|---|---|
| 20 | 110 | 0 | 3 |
|    | 120 | 0 | 2 |
|    | 130 | 0 | 0 |
| C18 | 110 | 2 | 25 |
|    | 120 | 1 | 25 |
|    | 130 | 0 | 20 |
| C19 | 110 | 1 | 25 |
|    | 120 | 2 | 24 |
|    | 130 | 0 | 12 |

Example 21 and Comparative Examples C20–C22

The blend of Example 21 was the same as that of Example 8. C20 was the same EVOH used in preparing Example 8. C21 was the same blend as C16. C22 was the same blend as C17. Table XIII lists the melt flow rate (melt index) of these examples and comparative examples (ASTM D-1238) measured after exposure to 230° C. in the melt index barrel for various time intervals. The melt flow index of Comparative Examples C21 and C22 decreased significantly with increased holding time. Example 21 exhibited much more stable melt flow.

TABLE XIII

MELT STABILITY

| | Melt Flow, g/10 min. | | |
|---|---|---|---|
| Ex. | 5 min. | 60 min. | 90 min. |
| 21 | 4.7 | 2.50 | 1.70 |
| C20 | 5.9 | 3.40 | 2.30 |
| C21 | 4.9 | 0.25 | 0.08 |
| C21 | 4.8 | 1.10 | 0.23 |

Thermal stability of EVOH resin is important for successful melt processing. Blending semicrystalline nylon into EVOH is known to cause an increase in melt viscosity. It is believed that chemical reaction occurs between the nylon and the EVOH. It is surprising that the EVOH blends of this invention have a much more stable viscosity.

We claim:

1. A multiple layer structure wherein at least one of the layers is prepared from a blend consisting essentially of about 50 to about 95 percent by weight of an ethylene vinyl alcohol copolymer having a copolymerized ethylene content of about 20 to about 60 mole percent and a degree of saponification of at least about 90 %, and about 5 to about 50 percent by weight of a polyamide blend consisting essentially of about 30 to about 90 percent by weight of at least one amorphous polyamide characterized by the lack of an endotherm crystalline melting peak as measured by differential scanning calorimetry and further characterized by a glass transition temperature of up to about 160° C., and about 10 to about 70 percent by weight of at least one semicrystalline polyamide which si miscible with the ethylene vinyl alcohol copolymer, said miscibility evidenced by the presence of a single glass transition temperature or a depressed melting point in blends of such semicrystalline polyamide with said ethylene vinyl alcohol copolymer, as measured by differential scanning calorimetry.

2. The multiple layer structure of claim 1 wherein the amorphous polyamide comprises about 60 to about 80 percent by weight of the polyamide blend.

3. The multiple layer structure of claim 1 wherein the ethylene vinyl alcohol copolymer is present at about 75 to about 85 percent by weight and the polyamide blend is present at about 15 to about 25 percent by Weight.

4. The multiple layer structure of claim 1 wherein the amorphous polyamide is selected from the group consisting of hexamethylenediamine isophthalamide, hexamethylenediamine isophthalamide/terephthalamide terpolymer, having isophthalic/terephthalic moiety ratios of 100/0 to 60/40, mixtures of of 2,2,4and 2,4,4-trimethylhexamethylenediamine terephthalamide, copolymers of hexamethylenediamine and 2-methylpentamethylenediamine with iso- or terephthalic acids, or mixtures of these acids.

5. The multiple layer structure of claim 1 wherein at least one of the layers comprises a polymer suitable to provide structural support for the layer of ethylene vinyl alcohol copolymer and polyamide.

6. The multiple layer structure of claim 5 wherein the polymer providing structural support is selected from the group consisting of polybutylene, polypropylene, polypropylene copolymers with ethylene, polyethylene, polyethylene copolymers, copolymers of ethylene with vinyl acetate, copolymers of ethylene with carboxylic acids wherein the carboxylic acid is unneutralized or is neutralized to form an ionomer, polyethylene terephthalate, polymers based on vinyl chloride, polymers based on styrene, and blends of such polymers.

7. The multiple layer structure of claim 4 which also contains at least one layer of adhesive.

8. A formed structure prepared by subjecting the multiple layer structure of claim 5 to a three-dimensional deformation process.

9. The formed structure of claim 8 in the form of a container.

10. A formed structure prepared by subjecting to a three-dimensional deformation process a multiple layer structure wherein at least one of the layers is a blend consisting essentially of about 50 to about 95 percent by weight of an ethylene vinyl alcohol copolymer having a copolymerized ethylene content of about 20 to about 60 mole percent and a degree of saponification of at least about 90%, and about 5 to about 50 percent by weight of an amorphous polyamide characterized by the lack of an endotherm crystalline melting peak as measured by differential scanning calorimetry and further characterized by a glass transition temperature of up to about 160° C., and wherein at least one of the layers comprises a polymer suitable to provide structural support for the layer of ethylene vinyl alcohol copolymer and polyamide.

11. The formed structure of claim 10 wherein the blend consists essentially of about 70 to about 90 percent by weight of the ethylene vinyl alcohol copolymer and about 10 to about 30 percent by weight of the amorphous polyamide.

12. The formed structure of claim 10 wherein the multiple layer structure before thermoforming has a total thickness of about 0.5 to about 3.5 mm.

13. The formed structure of claim 10 wherein the amorphous polyamide has a glass transition temperature of about 80° to about 130° C.

14. The formed structure of claim 10 wherein the amorphous polyamide is selected from the group consisting of hexamethylenediamine isophthalamide, hexamethylenediamine isophthalamide/terephthalamide terpolymer having isophthalic/ terephthalic moiety ratios of 100/0 to 60/40, mixtures of 2,2,4-and 2,4,4-trimethylhexamethylenediamine terephthalamide, copolymers of hexamethylenediamine and 2-methylpentamethylenediamine with iso- or terephthalic acids, or mixtures of these acids.

15. The formed structure of claim 10 in the form of a container.

16. The formed structure of claim 12 in the form of a container.

17. The formed structure of claim 14 in the form of a container.

18. The multiple layer structure of claim 1 in the form of a biaxially oriented film.

19. The multiple layer structure of claim 1 in the form of an oriented shrink film.

20. A formed structure prepared by subjecting to a three-dimensional deformation process a multiple layer structure wherein at least one of the layers is prepared from a blend consisting essentially of about 50 to about 95 percent by weight of an ethylene vinyl alcohol copolymer having a copolymerized ethylene content of about 20 to about 60 mole percent and a degree of saponification of at least about 90%, and about 5 to about 50 percent by weight of a polyamide component consisting essentially of about 30 to 100 percent by weight of at least one amorphous polyamide characterized by the lack of an endotherm crystalline melting peak as measured by differential scanning calorimetry and further characterized by a glass transition temperature of up to about 160° C., and 0 to about 70 percent by weight of at least one semicrystalline polyamide which is miscible with the ethylene vinyl alcohol copolymer, said miscibility evidenced by the presence of a single glass transition temperature or a depressed melting point in blends of such semicrystalline polyamide with said ethylene vinyl alcohol copolymer, as measured by differential scanning calorimetry, and wherein at least one of the layers comprises a polymer suitable to provide structural support for the layer of ethylene vinyl alcohol copolymer and polyamide.

* * * * *

UNITED STATES PATENT AND TRADEMARK OFFICE
CERTIFICATE OF CORRECTION

PATENT NO.  :  5,064,716
DATED       :  November 12, 1991
INVENTOR(S) :  Chou et al.

It is certified that error appears in the above-identified patent and that said Letters Patent is hereby corrected as shown below:

In claim 1, at column 18, line 8, change the word "si" to read --is--.

In claim 3, at column 18, line 20, change the word "Weight" to read --weight--.

In claim 4, at column 18, line 26, delete the extra "of".

Signed and Sealed this

Sixteenth Day of March, 1993

*Attest:*

STEPHEN G. KUNIN

*Attesting Officer*  *Acting Commissioner of Patents and Trademarks*